United States Patent
Rhoades

(10) Patent No.: US 7,206,929 B2
(45) Date of Patent: *Apr. 17, 2007

(54) METHOD FOR CUSTOMIZING A COMPUTER SYSTEM BY USING STORED CONFIGURATION PARAMETERS IN A CONFIGURISM MECHANISM

(75) Inventor: David B. Rhoades, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 431 days.

This patent is subject to a terminal disclaimer.

(21) Appl. No.: 10/748,898

(22) Filed: Dec. 30, 2003

(65) Prior Publication Data

US 2005/0149715 A1    Jul. 7, 2005

(51) Int. Cl.
*G06F 9/00* (2006.01)
(52) U.S. Cl. .............................. 713/1; 713/2
(58) Field of Classification Search .................. 713/1, 713/2, 100
See application file for complete search history.

(56) References Cited

U.S. PATENT DOCUMENTS

| | | | | |
|---|---|---|---|---|
| 5,404,580 A | * | 4/1995 | Simpson et al. | 455/558 |
| 5,927,050 A | | 7/1999 | Houck et al. | 53/428 |
| 5,991,875 A | * | 11/1999 | Paul | 713/2 |
| 5,996,074 A | | 11/1999 | Houck et al. | 713/2 |
| 6,115,384 A | | 9/2000 | Parzych | 370/401 |
| 6,173,331 B1 | | 1/2001 | Shimonishi | 709/232 |
| 6,353,885 B1 | * | 3/2002 | Herzi et al. | 713/1 |
| 6,381,636 B1 | * | 4/2002 | Cromer et al. | 709/211 |
| 6,578,142 B1 | | 6/2003 | Anderson et al. | 713/2 |
| 6,851,614 B2 | * | 2/2005 | Garnett | 235/487 |
| RE38,762 E | * | 7/2005 | O'Connor | 713/2 |
| 6,961,791 B2 | * | 11/2005 | Cepulis | 710/104 |
| 2003/0036875 A1 | | 2/2003 | Peck et al. | 702/127 |
| 2003/0037325 A1 | | 2/2003 | Hargrove et al. | 71/175 |

OTHER PUBLICATIONS

"Continuous Server Health Monitoring, Controlling, and Alerting," IBM US Announcement Supplemental Information, Mar. 11, 2003, pp. 1-4.

"IBM Remote Supervisor Adapter-Now with High-Performance Graphical Console Redirection," Hardware Announcement, Mar. 11, 2003, pp. 1-3.

\* cited by examiner

*Primary Examiner*—Rehana Perveen
*Assistant Examiner*—Paul Yanchus, III
(74) *Attorney, Agent, or Firm*—Patrick J. Daugherty; Driggs, Hogg & Fry Co., LPA

(57) ABSTRACT

The present invention is related to a method and system for customizing a computer system. According to a preferred embodiment, the method includes storing customization information for the computer system in a configuration mechanism and coupling the configuration mechanism to the computer system. The customization information in the configuration mechanism is then retrieved by the computer system to customize the computer system.

8 Claims, 2 Drawing Sheets

METHOD FOR CUSTOMIZING A COMPUTER SYSTEM BY USING STORED CONFIGURATION PARAMETERS IN A CONFIGURISM MECHANISM

FIELD OF THE INVENTION

The present invention relates to computer systems and more particularly to a method and system for customizing a computer system.

BACKGROUND OF THE INVENTION

Typically, a computer system is provided with a preconfigured operating system (OS), which is then customized or configured for a specific user. The configuration of the OS generally involves assigning configuration parameters, such as a computer name, host name, host IP address, host gateway, host subnet, etc., to the computer system, and can be performed by a reseller or dealer, on site via an automated process, or on site by the specific user.

If performed by the reseller or dealer, the computer system's final destination must be known prior to the configuration process. For large computer system rollouts, the dealer will typically store a large quantity of computer systems and customize them as they are deployed to various destinations. If these computer systems are not shipped immediately to their respective destinations, but warehoused instead, the dealer must be able to identify a particular computer system, e.g., by serial number, for a particular destination at shipping time. Physically identifying the particular computer system among thousands of warehoused computer systems can be a daunting task. If the computer system is shipped to an incorrect destination, the configuration parameters embedded in the computer system's OS will not correspond to the destination, and the computer system will not operate correctly.

At the user's site, the system configuration can be deployed via an automated process, e.g., by transmitting the customized OS over a network link. Nevertheless, this process requires network bandwidth and if the customized OS is large, e.g., 10–15 gigabytes, the transmission can take hours. Alternatively, the OS can be customized manually by the user, which introduces data entry errors. Nevertheless, for complex program images, it may be necessary to incur the expense of hiring a skilled configuration expert to handle the customization.

Accordingly, there exists a need for a method and system for customizing a computer system. The method and system should allow the computer system to be configured quickly at the dealer or on site, and should have little or no impact on network bandwidth. The present invention addresses such a need.

SUMMARY OF THE INVENTION

The present invention is directed to a method and system for customizing a computer system. According to a preferred embodiment, the method includes storing customization information for the computer system in a configuration mechanism and coupling the configuration mechanism to the computer system. The customization information in the configuration mechanism is then retrieved by the computer system to customize the computer system.

Through aspects of the preferred embodiment of the present invention, the configuration mechanism and the computer system are shipped separately but in the same shipment to a customer site. The configuration mechanism is then coupled to the computer system at the customer site. During a first system boot, the computer system queries the configuration mechanism to retrieve the customization information.

DETAILED DESCRIPTION

The present invention relates to computer systems and more particularly to a method and system for customizing a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to the preferred embodiment of the present invention, configuration parameters that are utilized to customize a computer system's OS are stored in a configuration mechanism. The configuration mechanism preferably is a PCI adapter that includes at least one communication port. When coupled to the computer system, the configuration mechanism provides the necessary information to customize the computer system.

Through aspects of the preferred embodiment of the present invention, a generic computer system is shipped to a destination, e.g., a remote branch office, along with a configuration mechanism that includes configuration parameters for the remote branch. At the remote branch, the configuration mechanism is coupled, e.g., plugged in, to the computer system. During a first system boot, the computer system automatically customizes its OS via the configuration mechanism.

Figure 1:
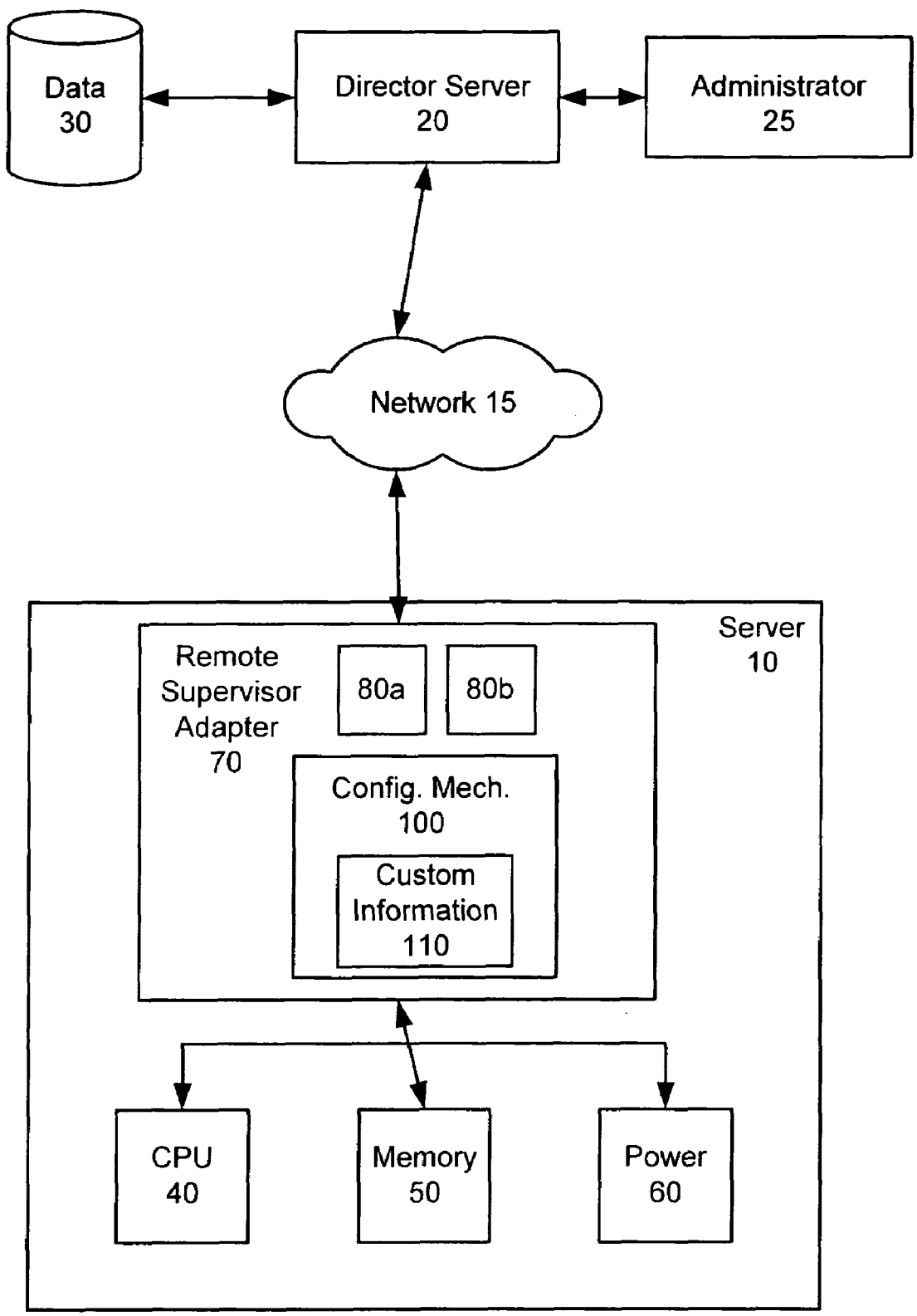
FIG. 1 is a block diagram depicting a computer system 10 according to a preferred embodiment of the present invention.

To describe the preferred embodiment of the present invention in more detail, please refer now to FIG. 1, which is a block diagram depicting a computer system 10 according to a preferred embodiment of the present invention. The computer system 10 preferably is a server 10, such as an xSeries™ server developed by International Business Machines of Armonk, N.Y. As is shown, the server 10 includes standard components, such as a CPU 40, memory 50, and a power source or adapter 60. Those skilled in the art readily appreciate that the server 10 includes other standard components and devices that are not illustrated in FIG. 1. The server 10 also includes a remote supervisor adapter (RSA) 70, which allows a system administrator 25 to manage the server 10 remotely, e.g., via an out-of-band network interface (not shown), or in another embodiment, via a built-in web interface on the RSA 70 (not shown).

The RSA 70 provides continuous remote access to the server 10 regardless of the on or off status of the server 10. In addition, the RSA 70 continuously monitors critical system components for potential problems and alerts the administrator 25 of events that can impact the system operation. The RSA 70 is a PCI adapter that includes a serial port 80a for supporting system management functions through a modem, an Ethernet port 80b for enabling system management functions over a LAN connection, and a power connector and AC adapter (not shown). Through the Ethernet port 80b, the RSA 70 can be connected directly to a data network or to a dedicated management LAN 15. The system management functions of the RSA 70 can be exploited at any time or anywhere from the LAN 15, even if the server 10 has failed or is powered off. Moreover, LAN throughput allows for increased performance and additional functions.

According to a preferred embodiment of the present invention, the RSA 70 includes a configuration mechanism 100. The configuration mechanism 100 stores customization information 110, including configuration parameters, that are used to personalize the server 10. Such configuration parameters include IP address information, computer name, host name and other personalized information. While FIG. 1 shows the configuration mechanism 100 integrated in the RSA 70, those skilled in the art would appreciate that the configuration mechanism 100 can also be a stand alone module coupled to a PCI adapter, such as the RSA 70.

Figure 2:
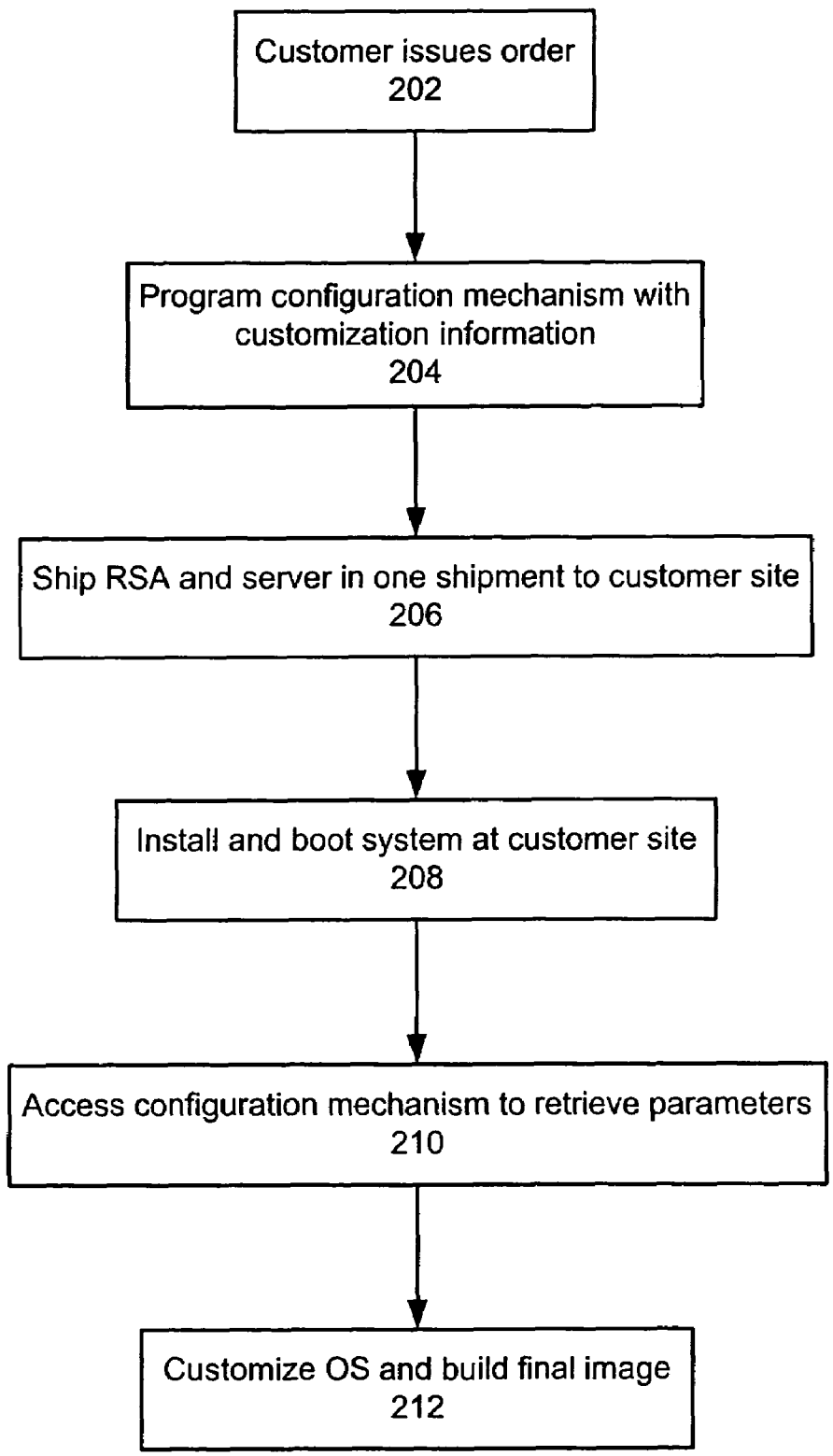
FIG. 2 is a flowchart illustrating a process for configuring the server 10 according to a preferred embodiment of the present invention.

To describe how the configuration mechanism 100 is utilized to customize the server 10, please refer now to FIG. 2, which is a flowchart illustrating a process for customizing the server 10 according to a preferred embodiment of the present invention. The process begins at step 202 when a customer orders one or more servers 10 from a dealer. Presumably, the dealer has warehoused multiple servers that have been built with a specified configuration with the exception of the customized configuration parameters. The order typically includes all the information necessary to customize the server. In step 204, the dealer takes an RSA 70 and programs a configuration mechanism 100 therein to include the customization information 110, including configuration parameters, derived from the order. This programming process can be performed quickly via the Ethernet port 80b in the RSA 70.

Once programmed, the RSA 70 and the server 10 are shipped separately but in the same shipment to the customer site in step 206. Accordingly, the server 10 is not removed from its packaging. There, the customer installs the RSA 70 into the server 10, turns the server on, and initiates a booting process in step 208. During the first system boot, the server 10 queries the RSA 70, accesses the configuration mechanism 100 and retrieves the customization information 110, including the configuration parameters via step 210. In a preferred embodiment, the customization information 110 is embedded into corresponding sections of a SysPrep.INF file, which is utilized during a SysPrep process. It is noted that while SysPrep is the application/supported process for MicroSoft operating systems, the customization information 110 can also be embedded in equivalent portions of applications and processes used for other well known operating systems. The configuration parameters 110 are then used to customize the OS and to build the final system image in step 212. In a preferred embodiment, the customizing step can be performed by booting first into a DOS partition that calls the RSA 70 and performs the personalization prior to loading the OS.

While the above process describes a dealer programming the configuration mechanism 100, those skilled in the art will recognize that other parties can also perform the programming step as well. For instance, a manufacturer or even a third party shipping company can offer this service to its customers. Moreover, the configuration mechanism 100 can also be programmed quickly by downloading the customization information 110 from a Director server 20 (FIG. 1) to the RSA 70 via the Ethernet port 80b.

Through aspects of the preferred embodiment of the present invention, a computer system can be automatically customized at a customer site during the first system boot. By programming the configuration mechanism(s) 100 at the time an order is fulfilled and shipping the programmed configuration mechanism(s) 100 along with the generic server(s) 10, the dealer, manufacturer, or shipping company need not be concerned with shipping a warehoused system that has been preconfigured to the incorrect address.

Although the present invention has been described in accordance with the embodiment shown, one of ordinary skill in the art will readily recognize that there could be variations to the embodiment and those variations would be within the spirit and scope of the present invention. For example, the configuration mechanism can be implemented as a stand alone PCI adapter and does not necessarily require an RSA. Accordingly, many modifications may be made by one of ordinary skill in the art without departing from the spirit and scope of the appended claims.

What is claimed is:

1. A method for customizing a computer system, comprising the steps of:

receiving a customer order, wherein the customer order specifies customization information for a computer system;

programming customization parameters into a configuration mechanism, wherein the configuration parameters correspond to the customization information;

sending the configuration mechanism to a customer;

sending a computer system to the customer, the computer system being adapted to receive the configuration mechanism and to customize the computer system according to the configuration parameters stored in the configuration mechanism;

providing instructions to the customer to install the configuration mechanism in the computer system; and providing instructions to the customer to initiate a boot process; wherein, the computer system includes a data storage device having a first partition including a first operating system, and a second partition including a second operating system and, in response to the initiation of the boot process, the computer system first boots to the second partition to execute the second operating system which causes the first operating system in the first partition to be customized according to the configuration parameters stored in the configuration mechanism and, upon completion of the customization of the first operating system, the computer system boots to the first partition and executes the first operating system.

2. The method of claim 1 further comprising the step of the configuration mechanism allowing a system administrator to manage the computer system remotely independent of an on or off status of the computer system.

3. The method of claim 1 further comprising the step of the configuration mechanism monitoring at least one computer system component for at least one problem event.

4. The method of claim 3 further comprising the step of the configuration mechanism notifying a system administrator of an occurrence of the at least one problem event.

5. The method of claim 1 further comprising the steps of:

including the configuration mechanism in an adapter pluggable into the computer system, the adapter including a communications port;

storing the customization information in a memory;

converting the customization information stored in the memory to the customization parameters;

loading the customization parameters from the memory to the configuration mechanism via the adapter communications port.

6. The method of claim 1, further including the step of shipping the computer system and the configuration mechanism separately but in a same shipment to the customer.

7. The method of claim 1 further comprising the step of the configuration parameters comprising at least one of a group comprising a computer name, a host name, a host IP address, a host gateway and a host subnet.

8. The method of claim 1 wherein the customized first operating system has a size of at least about 10 gigabytes.

* * * * *